United States Patent
Bolton et al.

(10) Patent No.: US 7,108,097 B1
(45) Date of Patent: Sep. 19, 2006

(54) POWER ASSISTED RECUMBENT BICYCLE AND POWER UNIT

(76) Inventors: Brent Cecil Bolton, 1817 SE. Mulberry Ave., Portland, OR (US) 97214-4765; Wesley Robert Lapp, 5805 Billings Rd., Parkdale, OR (US) 97041

( * ) Notice: Subject to any disclaimer, the term of this patent is extended or adjusted under 35 U.S.C. 154(b) by 0 days.

(21) Appl. No.: 10/820,190

(22) Filed: Apr. 6, 2004

(51) Int. Cl.
*B62K 11/00* (2006.01)
*B62K 3/02* (2006.01)

(52) U.S. Cl. .................................. 180/205; 280/288.1
(58) Field of Classification Search ............ 280/288.1, 280/214, 212, 288.4; 180/205, 206, 207, 180/220
See application file for complete search history.

(56) References Cited

U.S. PATENT DOCUMENTS

| | | | | |
|---|---|---|---|---|
| 3,280,932 A | * | 10/1966 | Moulton | 180/205 |
| 3,429,584 A | * | 2/1969 | Hendricks | 280/261 |
| 3,664,684 A | * | 5/1972 | Long | 280/231 |
| 3,827,519 A | * | 8/1974 | Snider | 180/205 |
| 4,108,460 A | * | 8/1978 | Silva, Jr. | 280/236 |
| 4,280,581 A | | 7/1981 | Rudwick | |
| 5,036,937 A | * | 8/1991 | Tanaka | 180/205 |
| 5,242,028 A | | 9/1993 | Murphy | |
| 5,474,148 A | | 12/1995 | Takata | |
| 5,509,678 A | * | 4/1996 | Ullman et al. | 280/281.1 |
| 5,853,062 A | | 12/1998 | Hulett | |
| 6,062,329 A | | 5/2000 | Chai | |
| 6,070,894 A | * | 6/2000 | Augspurger | 280/249 |
| 6,352,131 B1 | | 3/2002 | Lin et al. | |
| 6,591,929 B1 | | 7/2003 | Tsuboi | |

\* cited by examiner

*Primary Examiner*—Tony Winner (57) ABSTRACT

An recumbent bicycle or tricycle, FIG. 1B, having an electric assist module mounted between the pedal mechanism and rear wheel gear mechanism. This mounting position allows the assist module to take advantage of the bicycle or tricycle's rear wheel gears to increase performance with the secondary advantage of reducing the length of the chain driving the rear wheel gears resulting in improved shifting.

7 Claims, 10 Drawing Sheets

Prior Art

POWER ASSISTED RECUMBENT BICYCLE AND POWER UNIT

CROSS REFERENCE TO RELATED APPLICATIONS

Not Applicable

FEDERALLY SPONSORED RESEARCH

Not Applicable

SEQUENCE LISTING OR PROGRAM

Not Applicable

BACKGROUND OF THE INVENTION

1. Field of Invention

The present invention relates to electrically powered bicycles and tricycles and more particularly to electric-assisted recumbent bicycles and tricycles and retrofit electric motor conversions for production recumbent bicycles and tricycles.

2. Background of the Invention

Electric bicycles of the conventional diamond frame or upright variety have become relatively common in the marketplace and are well represented in the prior art. Conventional bicycles designed from the ground up to be electric assisted as well as retrofit kits for conventional bicycles exist in multiple forms.

Similarly, recumbent bicycles and tricycles have become increasingly common in the market. However, we know of no recumbents on the market designed with electric assist even though at least one, Hulett U.S. Pat. No. 5,853,062 is represented in the prior art.

A few electric-assisted recumbent bicycles have been produced by retrofitting production recumbent bicycles with conversion kits designed for conventional upright bicycles. These have met with only limited commercial success.

We believe this situation exists in part because of the lack of suitable retrofit electric conversions for recumbent bicycles and tricycles. Conversions designed for conventional bicycles often are difficult or impossible to adapt to recumbents. This is because, while conventional bicycles almost all use a similar frame design and a narrow range of wheel sizes, recumbents use widely varying frame designs and wheel sizes.

Most upright bicycle electric conversions on the market today attach in some way to the rear frame triangle formed by an upright seat post tube, two horizontal chain stay tubes, and diagonal tubes running from the rear axle drop-outs to the top of the seat post tube. Many recumbent bicycles lack this triangle and hence cannot be fitted with standard retrofit electric drives with the exception of hub motors.

Hub motors require a special wheel and limit gearing options for the cyclist. If used on a front wheel, there is a potential safety issue on recumbents because the front wheel is often lightly loaded. This could lead to wheel slippage under power potentially causing the rider to lose her balance.

A further limitation to the use of conventional electric assist conversions on recumbent bicycles or tricycles is that conventional bikes almost universally use 26 or 27-inch wheels. The conversion kits are geared with this wheel size in mind. Recumbents often use smaller 24, 20, or even 16-inch wheels resulting in poor top speed when fitted with these conversions.

This last point underscores a further limitation of the electric assist conversions on the market today. All use a single fixed speed ratio between motor and driven wheel. Electric bicycle motors are limited by law to 750 W in the US and less in some other countries. This power limitation means that assist motors must either be geared for good hill climbing or good top speed. No single speed conversion on the market today excels at both.

All high performance bicycles must have some means of varying the speed ratio between pedals and driven wheel in order to accommodate the limitations of the human rider. It only makes sense therefore to provide some way for an assist motor to take advantage of this same means in order to increase performance.

Numerous inventors over the years have tried to do just that. Lin U.S. Pat. No. 6,352,131; Tsuboi U.S. Pat. No. 6,591,929; and Rudwick U.S. Pat. No. 4,280,581 to name a few. All have had to confront the cramped space between the pedals and wheel of a conventional bicycle that makes such a conversion difficult to do. As a result no such conversions have yet enjoyed any commercial success though a few electric bicycles have been designed from the ground up with multi-speed gearing for their assist motors.

Murphy, U.S. Pat. No. 5,242,028 describes a system whereby a motor drives a special bottom bracket and pedal assembly via a short chain. The motor is detachably mounted to the down tube in front of the bottom bracket. This specialized bottom bracket requirement forces removal and replacement of these components on a standard bicycle, increasing costs. Further, the motor and speed reducer must fit within the cramped space between the circular pedal paths and the front wheel. This limits the motor size and hence torque and power, partially canceling the advantages of geared operation. Lin, U.S. Pat. No. 6,352,131 and Tsuboi, U.S. Pat. No. 6,591,929 are similar and suffer from the same limitations.

Hulett U.S. Pat. No. 5,853,062; describes an electric assisted recumbent bicycle that is special purpose in the sense that the bicycle is expressly designed to accept the motor drive. The motor and battery system is deliberately placed as far forward as possible in order to counterweight the rear seated rider. This places the motor into the space between the rotating pedal paths as with the conventional bike conversions mentioned above, limiting the width of the system. This constrains battery and motor size unnecessarily and thus limits battery capacity and motor torque.

In Hulett's design the reason for the forward motor and battery placement is to place additional weight over the front wheel to offset the rearward weight bias caused by placing the rider over the rear wheel. Experience with production recumbent bicycles with the rider over the rear wheel has shown that this is unnecessary. For an electric assisted recumbent bicycle, if additional forward weight bias is desired, it can easily be accomplished by placing a portion of the battery load forward. Hulett's motor drive configuration is unnecessarily complex for this application.

Inherent in the design of recumbent bicycles and tricycles is a long distance between pedals and rear wheel. Hulett only partially takes advantage of the improved electric drive packaging this allows, failing to use the space midway between pedals and rear wheel and allowing pedal path spacing to constrain system width. Furthermore, Hulett's system leaves intact the long chain line of the recumbent design. This is the root cause of a recumbent's poor shifting performance and that is likely to be exacerbated by the extra power supplied by a motor.

Rudwick, U.S. Pat. No. 4,280,581 describes a conventional upright bicycle frame wherein the rear triangle has been elongated to accommodate an assist motor that is similar to the present invention in that it uses dual overrunning clutches to effect independent pedal and motor operation. Rudwick's system, like Hulett, requires a special bicycle frame to implement and was built with the intent of capturing motor heat to warm a battery mounted above the motor housing to improve cold weather operation. Handling of a Rudwick bicycle is likely to seem odd to the average person with the rear wheel so far behind the rider. The unusual frame may account for the fact that this design never achieved any commercial success.

Recumbent bicycles and tricycles are characterized by having a reclined seating position that places the rider's feet well forward and inclines the rider's torso towards the rear. Except for front wheel drive designs, this rider orientation inevitably results in a long chain line between pedals and rear wheel. This long chain line is often difficult to route along the frame and, as mentioned, results in poor shifting performance.

The recumbent bicycle or tricycle also suffers from a couple of limitations that are inherent to the recumbent design itself. One is that the extended frame required by the design often results in a bike that is heavier than an equivalent upright bicycle. The other is that the reclined pedaling position reduces the mechanical transfer of energy from rider to bike. This is because on a conventional bicycle, the rider can stand on the pedals and use, arm, torso, and leg muscles to effect liftoff from the seat. On the down stroke when the rider returns to the seat, some of the energy transferred to the pedals will have come from the rider's arm and torso muscles. On a recumbent, all of the energy transferred to the pedals must come from the rider's legs.

Recumbents also have two inherent design advantages. The reclined riding position reduces frontal area resulting in improved aerodynamics. The reclined position is also more comfortable for most riders and is well suited to people with physical limitations.

The present invention is a recumbent bicycle or tricycle with an electric assist module interposed into the long chain line between pedals and rear wheel. The shorter rear chain allowed by the assist module improves shifting to a level comparable to conventional bicycles. Electric assist on a recumbent bicycle or tricycle is further of proportionally greater benefit to the recumbent than to a conventional bicycle. This is because the electric assist mitigates the design negatives of higher weight and reduced rider power while taking advantage of the better aerodynamics though higher operating speeds. An electric assist also further improves the recumbent design's usefulness to persons with physical limitations, enabling a new class of riders to enjoy the benefits of bicycling.

BACKGROUND OF THE INVENTION

Objects and Advantages

Accordingly, the objects and advantages of the present invention are:
(a) to provide an electric assisted recumbent bicycle or tricycle having multi-speed motor gearing;
(b) to provide an electric assist conversion for recumbent (as defined in this patent) bicycles and tricycles;
(c) to provide an electric assist conversion that provides for multi-speed operation by using the same speed changing means employed by the rider;
(d) to provide an electric assist conversion that, by the simple provision of a variety of mounting pieces, can be retrofitted to a variety of commercially available recumbent or other long chain line bicycles or tricycles;
(e) to provide an electric assist that improves shifting performance by splitting a long chain line into two sections, one short chain from the pedals to assist module and one short chain from the assist module to the rear wheel;
(f) to provide an electric assist that can be mounted away from the circular pedal path, reducing size limitations and improving torque and power;
(g) to provide an electric assist conversion that does not require the alteration of already installed components, in particular the bottom bracket and pedal assembly;
(h) to provide an electric assist that allows pedal and electric power to be blended in any proportion between all electric powered and all pedal powered solely by varying pedal force and throttle position.

A further object and advantage of the present invention is to provide a means whereby commercially available recumbent bicycles and tricycles may be turned into highly practical motorized transportation having minimal negative environmental consequences and being suitable for handicapped as well as normal riders. Still further objects and advantages will be apparent from consideration of the ensuing descriptions and drawings.

SUMMARY

In accordance with the present invention a power assisted recumbent bicycle or tricycle comprises a recumbent bicycle or tricycle, a motor, a motor controller, a speed reducer, and a pair of freewheels (also called overrunning or Sprag clutches) allowing independent operation of motor and pedals. The latter are all together in a power assist module that, by means of suitable brackets is mounted between pedals and rear wheel on the frame of the recumbent bicycle or tricycle. A means, either automatic or under rider control, is also provided for varying motor power, torque, or speed.

DRAWINGS—FIGURES

In the drawings, closely related figures have the same number but different alphabetic suffixes.

| DRAWINGS-REFERENCE NUMERALS | |
|---|---|
| | 20 drive chain |
| 20A front chain | 20B rear chain |
| 22 guide tube | 24 freewheel sprocket |
| 26 motor output shaft | 28 gear motor |
| 30 chain guard | 32 shaft |
| 34 sprocket | 36 freewheel sprocket |
| 38A sprocket | 38B shaft |
| 38C arm | 38D shaft |
| 38E spring | |
| 40 sprocket | |
| 42A sprocket | 42B shaft |
| 42C arm | 42D shaft |
| 44 strain gauge | |
| 46A roller chain | 46B chain tensioner |
| 48 plate | 50 flexible retainer |
| 52 rheostat | 54 motor controller |
| 56 battery pack | |
| 58A bracket | 58B bolt |
| 60 assist module | 62 chain tensioner |
| 64 force sensor | |

DETAILED DESCRIPTION

Figure 1A:
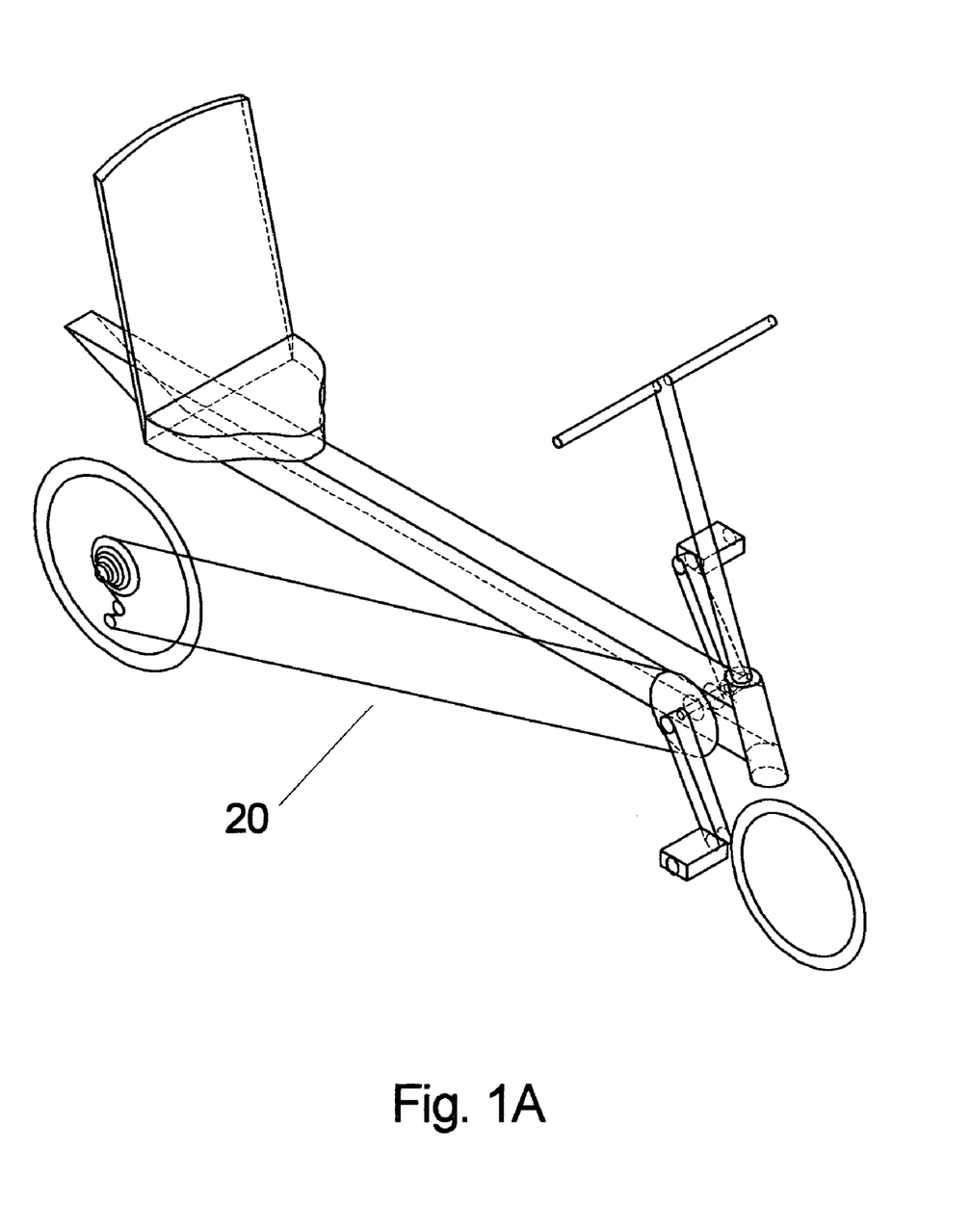
FIG. 1A shows a typical recumbent bicycle and illustrates the long chain line necessitated by this design.
Figure 1B:
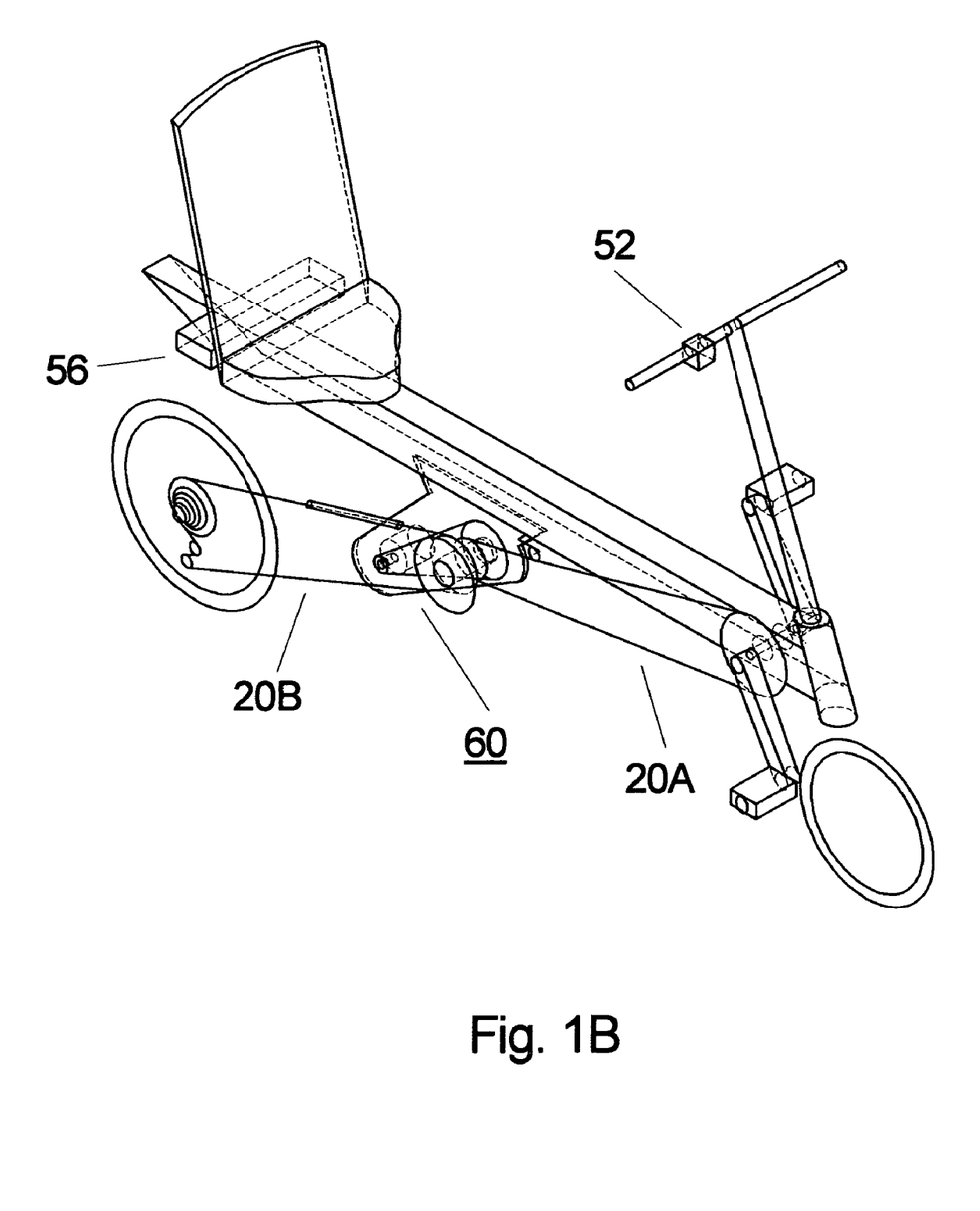
FIG. 1B shows the same recumbent bicycle with the power assist module interposed between pedals and rear wheel.
Figure 2A:
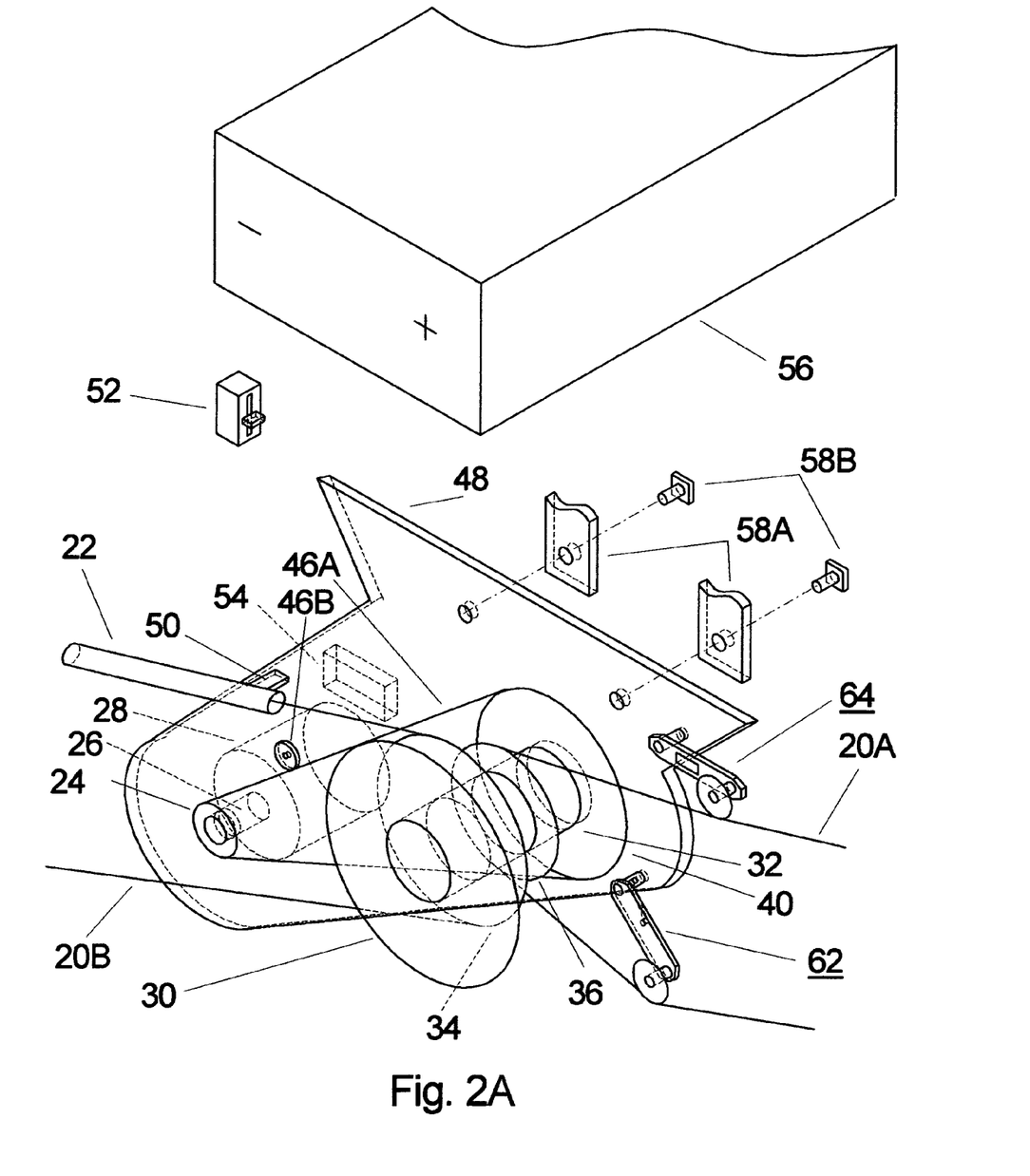
FIG. 2A shows a detailed view of the preferred embodiment of the power assist module.
Figure 2B:
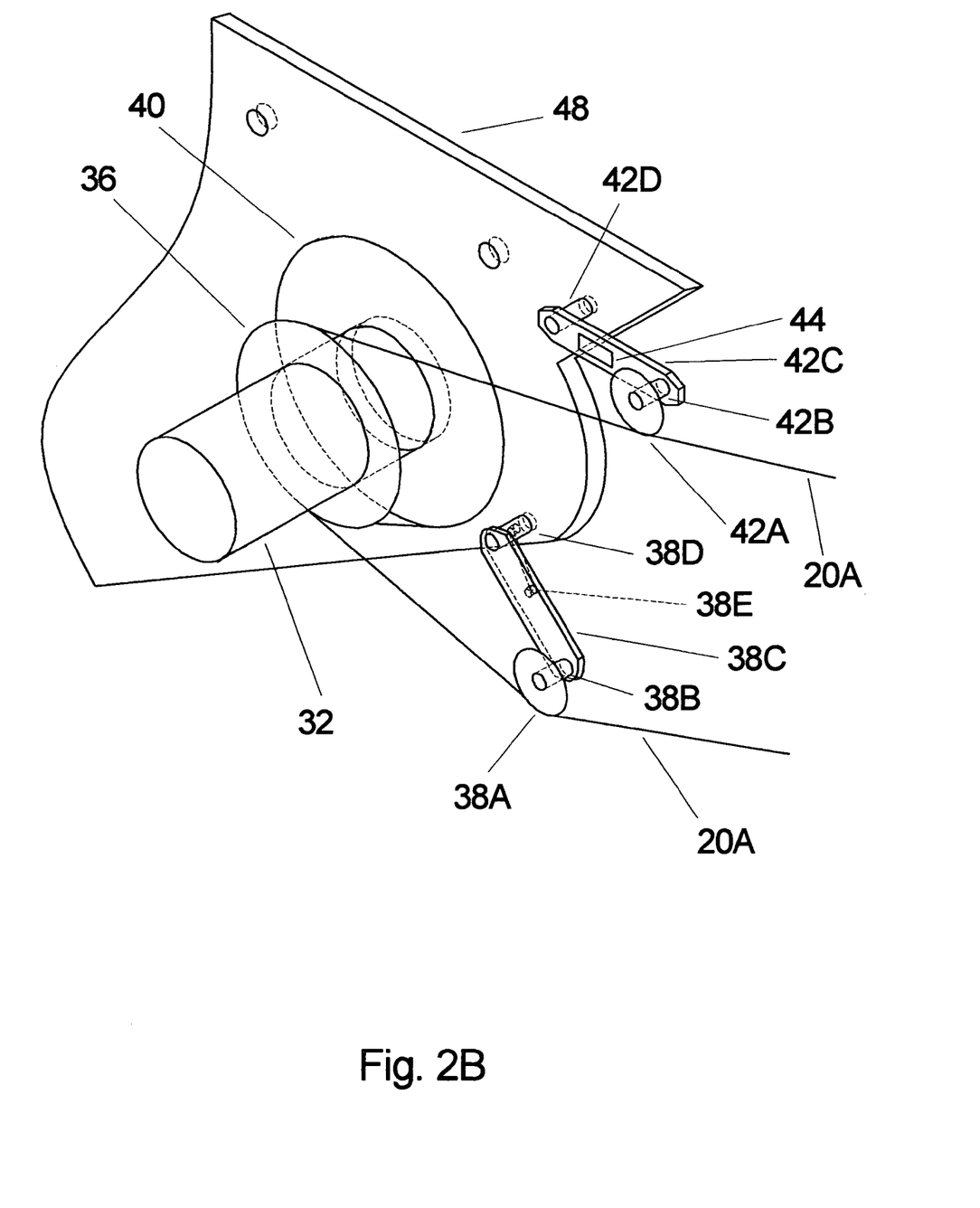
FIG. 2B shows detail of force sensor and chain tensioner

FIGS. 1A, 1B, 2

PREFERRED EMBODIMENT

FIG. 1A shows a typical recumbent bicycle. A tricycle would be similar except for having either two driven rear wheels or two steered front wheels. Note that the pedals are arranged substantially in front of the rider so that the rider's legs are near horizontal. The seat is equipped with a seat back allowing the rider's torso to be inclined rearward for better aerodynamic performance. The seat back also provides opposition to the rider's pedal force in lieu of gravitational opposition as on a conventional bicycle. In order to prevent the weight of the seated rider from lifting the front wheel, the rear wheel must be placed somewhat behind the rider. This implies that the distance from the pedals and the rear wheel axle must be greater than the distance between the tallest rider's spine and extended foot. If the bicycle or tricycle uses rear wheel drive as most do, this implies a chain line that is significantly longer than is common on a conventional bicycle.

FIG. 1B shows recumbent bicycle of the present invention. An electric assist module has been interposed into the chain line of the rear drive recumbent bicycle of FIG. 1A. The assist module 60 is mounted to the frame of the bicycle using suitable brackets approximately midway between the pedals and rear wheel. Two shorter chains replace drive chain 20 of the unmodified bicycle. Front chain 20A connects the bicycle's conventional pedal sprocket to freewheel sprocket 36 of the assist module 60. Rear chain 20B connects sprocket 34 to the bicycle's conventional rear wheel gear cassette or other gear change means.

Figure 1C:
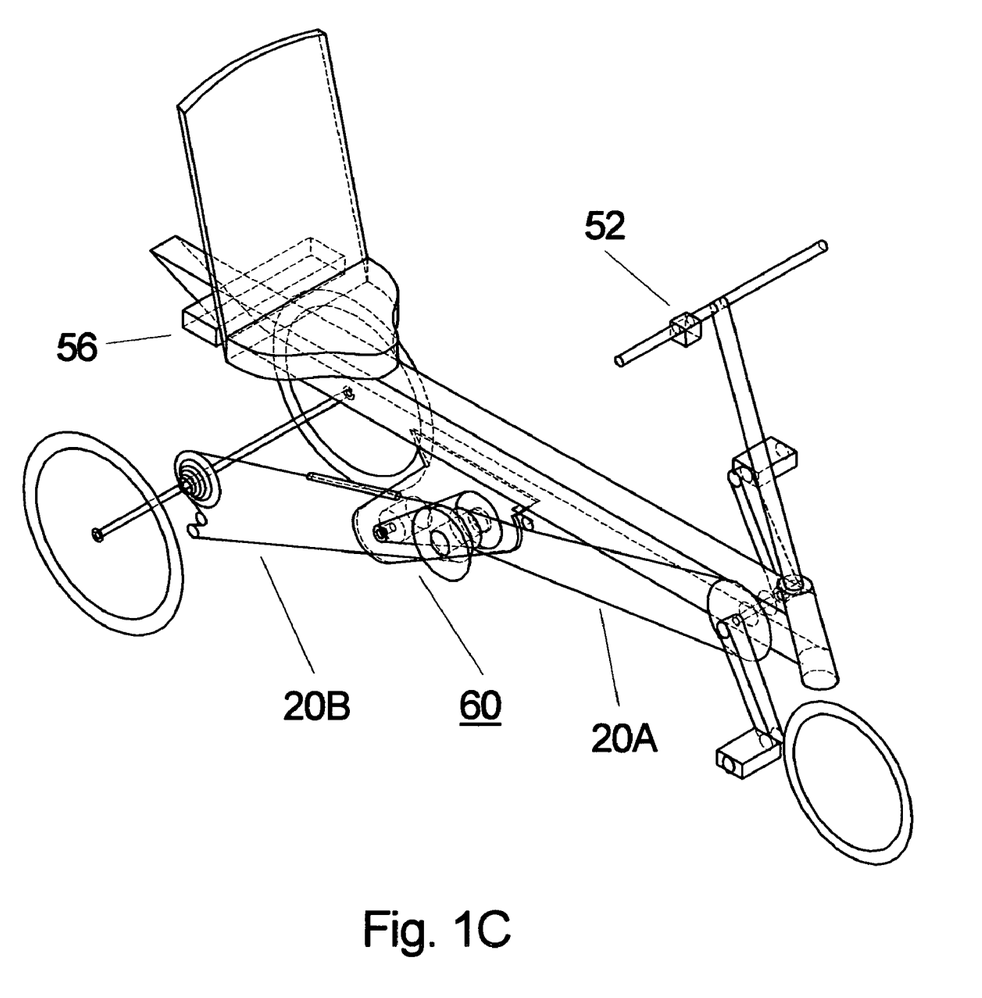
FIG. 1C shows a recumbent tricycle with said power assist unit.

FIG. 1C shows a recumbent tricycle of the present invention. Said electric assist module has been interposed into the chain line in the same manner as in FIG. 1B. The addition of a second driven wheel in the rear of the tricycle has no effect on the operation of said electric assist module.

Figure 1D:
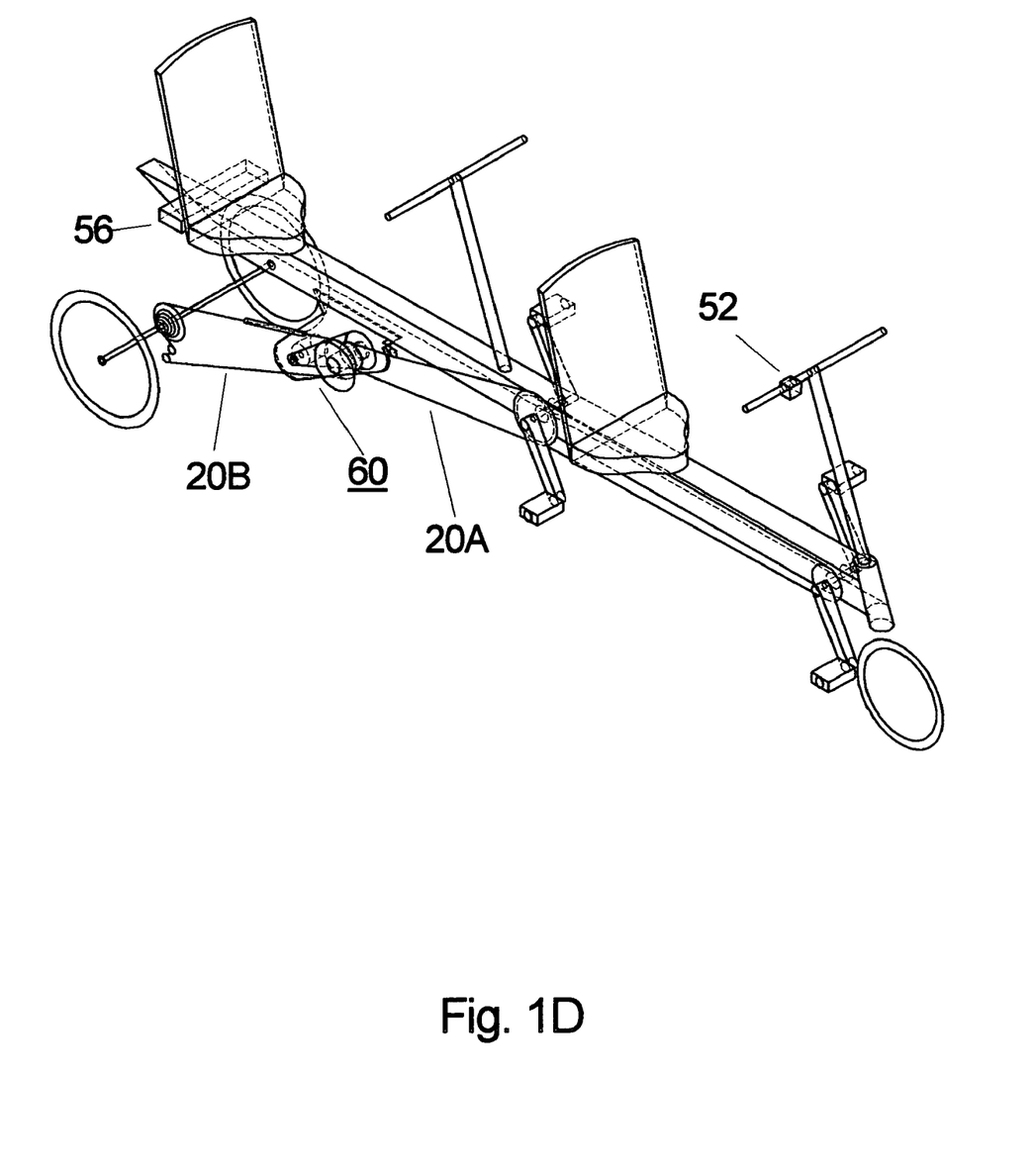
FIG. 1D shows a two seat recumbent tricycle with said power assist unit.

FIG. 1D shows a two seat recumbent tricycle of the present invention. Said electric assist module has been interposed into the chain line in the same manner as in FIG. 1B. The addition of a second seat and a second pedal mechanism in the front of the tricycle has no effect on the operation of said electric assist module.

Not shown is a two seat recumbent bicycle. It would have the seat and pedal mechanism arrangement of FIG. 1D combined with a single rear driven wheel as in FIG. 1B. Such an arrangement would have no effect on the operation of said electric assist module.

Referring to FIG. 2A, the preferred embodiment of the assist module comprises a plate 48 which serves as structural support and is attached to the recumbent bicycle frame via appropriate brackets 58A and bolts 58B or other suitable fasteners. The brackets must be secured to the bicycle frame in such a way as to resist several hundred pounds of chain tension between the rear wheel gear cassette and sprocket 34. The exact tension is dependent on motor power output and gearing. Note that chain tension supplied by the rider cancels at the mid-mounted assist module resulting in only slight twisting forces on the module caused by the sideways offset of sprocket 34 and freewheel sprocket 36.

A gear motor 28 is mounted on one side of plate 48 with motor output shaft 26 passing through the plate. Plate 48 should be sufficiently rigid to eliminate excessive flexing under load. The gear head on gear motor 28 is assumed to provide a modest amount of speed reduction, less than 10:1, in order to keep efficiency well above 80%.

Shaft 26 drives freewheel sprocket 24. Freewheel sprocket 24 is set up to engage when shaft 26 is rotating clockwise as fast as freewheel sprocket 24. If freewheel sprocket 24 is rotating faster than shaft 26 it is disengages from shaft 26.

Freewheel sprocket 24 drives sprocket 40 via roller chain 46A. Chain tensioner 46B takes up any slack in chain 46A. Freewheel sprocket 24 is smaller than sprocket 40 and provides additional speed reduction over and above that provided by the gear head of gear motor 28. Sprocket 40 is mounted onto shaft 32. Shaft 32 is rotatably mounted to plate 48. The total speed reduction provided by the gear head of gear motor 28 and sprockets 24 and 40 is sufficient to bring the maximum rotational speed of shaft 32 to less than approximately twice a rider's maximum pedal cadence. This corresponds to about 250 RPM and this figure was chosen for efficient power transfer to the bicycle's rear gear cassette.

Sprocket 34 is also mounted onto shaft 32 and drives rear chain 20B. Rear chain 20B in turn drives the bicycle's rear gear cassette.

Rear chain 20B passes through a guide tube 22 and emerges near sprocket 34. Guide tube 22 is mounted onto plate 48 via flexible retainer 50. Flexible retainer 50 allows guide tube 22 to move with the motions of rear chain 20B as it is shifted on a derailleur mechanism but resists all other motions. In particular, it must resist allowing the guide tube to travel along the chain in either direction. Guide tube 22 is made of polyethylene or some similar slippery abrasion resistant material and is of sufficiently large diameter to allow rear chain 20B to slide freely. Chain guard 30, also mounted to shaft 32, is a circular plate of a diameter larger than sprocket 34.

Freewheel sprocket 36 is also mounted onto shaft 32 and is driven by to the bicycle's conventional front pedal sprocket via front chain 20A. Freewheel sprocket 36 engages whenever it turns as fast as shaft 32.

It is intended that freewheel sprocket 36 be a conventional single speed bicycle freewheel and sprocket assembly such as used on single speed bicycles. Any freewheel or over-running clutch and sprocket combination that performs the same function may be used however.

Chain tensioner 62 serves to maintain tension in chain 20A and can be a commercially available chain tensioner such as is currently manufactured for the conversion of derailleur equipped bicycles to single speed operation.

Referring to FIG. 2B for details of chain tensioner 62, sprocket 38A is rotatably mounted onto shaft 38B. Shaft 38B mounts to arm 38C, which is rotatably mounted to shaft 38D. Shaft 38D is mounted to plate 48. Spring 38E exerts downward pressure on arm 38C, which in turn exerts downward pressure on chain 20A. Arm 38C is of sufficient length and has sufficient angular travel to accommodate a front derailleur gear change mechanism.

Force sensor 64 measures the tension in chain 20A. This tension varies with pedal pressure exerted by the rider and is an input to motor controller 54.

Again referring to FIG. 2B for details of force sensor 64, sprocket 42A is rotatably mounted to shaft 42B. Shaft 42B mounts to arm 42C. Arm 42C mounts to shaft 42D, which is attached to plate 48. Shaft 42D does not rotate. Sprocket 42A engages with front chain 20A and is positioned so that the chain bends slightly when under tension as it passes sprocket 42A. As the rider exerts pedal pressure the bent chain exerts an upward pressure on sprocket 42A. This pressure strains arm 42B. The strain is measured by strain gauge 44 and is proportional to the tension in chain 20A.

A rheostat 52 provides an additional input to motor controller 54. Motor controller 54 may be set up to use either rheostat 52, strain gauge 44, or both as control inputs. Rheostat 52 is intended to be handlebar mounted with thumb operated or twist operated action.

A battery pack 56 or other source of electric current supplies energy to the assist module. The battery pack may be mounted wherever is convenient. On a recumbent bicycle the area behind the seat usually provides ample space for mounting.

Operation

FIGS. 1B–2B

The assist module 60 of of FIG. 1B is mounted onto the frame of the recumbent bicycle or tricycle using brackets 58A and bolt 58B (FIG. 2A) that have been custom designed for that particular recumbent model. Referring to FIG. 2A, front chain 20A, a common bicycle chain, is connected between the bicycle or tricycle's conventional front sprocket and freewheel sprocket 36. Rear chain 20B, also a common bicycle chain, is connected between sprocket 34 and the bicycle or tricycle's conventional rear sprocket and gear change mechanism. Referring to FIG. 1B, rheostat 52 is attached to the bicycle or tricycle's handlebars and battery pack 56 is mounted in a convenient location such as behind the seat. This completes the assembly of a complete electric assisted recumbent bicycle or tricycle of the present invention.

When the rider pedals with the motor off, the front chain drives freewheel sprocket 36, which engages and rotates shaft 32. Shaft 32, in turn, drives sprocket 34, which transmits power via rear chain 20B to the bicycle's rear wheel gear cassette. Shaft 32 also drives sprocket 40, which, in turn, drives freewheel sprocket 24 via roller chain 46A. Since motor output shaft 26 is not rotating, freewheel sprocket 24 disengages and spins free causing minimal drag on the rider's pedal efforts.

When the motor is energized with the rider not pedaling, shaft 26 rotates and causes freewheel sprocket 24 to engage with the motor shaft. Freewheel sprocket 24 drives sprocket 40 via roller chain 46A. Sprocket 40 drives shaft 32, which, in turn, drives sprocket 34. Sprocket 34 transmits power to the rear wheel as before. Since the rider is not pedaling, front chain 20A is motionless therefore freewheel sprocket 36 does not rotate and disengages from shaft 32. Thus the motor does not drive the pedals when engaged.

When the rider is pedaling with the motor energized, both freewheel sprocket 24 and freewheel sprocket 36 engage with their respective shafts. The result is that rider and motor power blend at shaft 32 and the combined power is transmitted to the rear wheel.

One or both of two mechanisms control motor power output. Rheostat 52 is designed to supply a signal to motor controller 54 proportional to rider input. This allows motor power, torque, or speed to be varied under rider control.

A second mechanism, force sensor 64, is designed to measure front chain tension and supply a signal to motor controller 54 proportional to the rider's pressure on the pedals. This signal may be used to increase motor power, torque, or speed in proportion to rider effort, to enforce a maximum limit on the pedal pressure the rider need exert, or any other desired control law.

Motor controller 54 may also be set up to use both mechanisms in parallel. For example the chain tension measurement of force sensor 64 may be used to engage the motor when the rider exerts more than a pre-programmed amount of pedal effort. Rheostat 52 would then be available for the rider to signal a temporary desire for more power output than programmed.

Guide tube 22 serves two purposes. It damps the motions of rear chain 20B at the point where the chain engages with sprocket 34 preventing chain derailments. It also serves to keep fingers and clothing away from the moving chain. Chain guard 30, also mounted to shaft 32, is a circular plate of a diameter larger than sprocket 34. It provides an additional mechanism for keeping stray clothing and other objects away from moving parts.

Chain tensioner 62 serves three purposes. It allows for sufficient slack in front chain 20A to accommodate a front derailleur mechanism if the bicycle is so fitted. It also provides tension in chain 20A, even in the absence of a front derailleur, that allows the assist module 60 to be mounted in a fixed position on the bicycle frame. That is, the assist module need not be mounted so as to be moveable in order to take up slack in chain 20A. Finally, chain tensioner 62 allows for sufficient slack in chain 20A to limit injury to fingers or hands should they become trapped between chain and sprocket. This might occur when a rider attempts to fix an accidentally derailed chain by hand, for example.

Performance Ramifications

Figure 3:
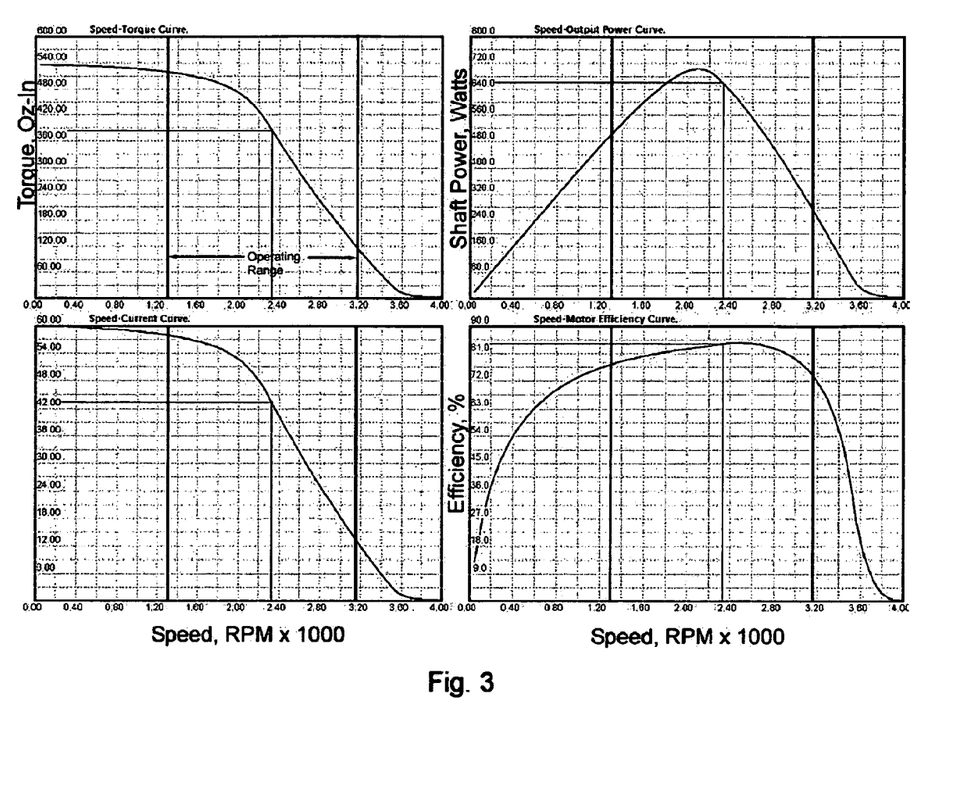
FIG. 3 shows current, torque, power and efficiency curves for a commercially available permanent magnet brushless DC bicycle motor.
Figure 4A:
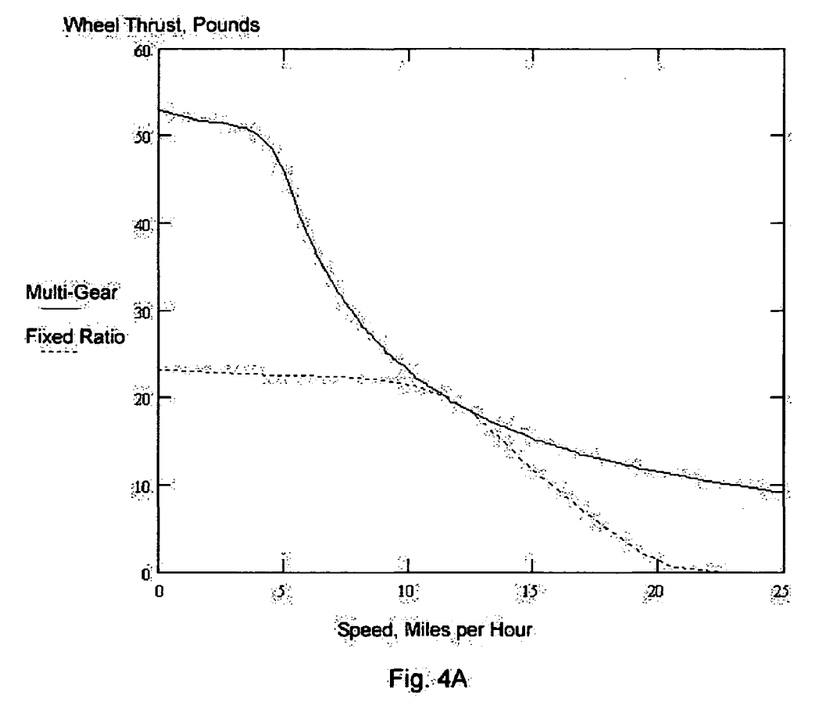
FIG. 4A shows a graph of electric bicycle rear wheel thrust vs speed for geared and single speed operation.
Figure 4B:
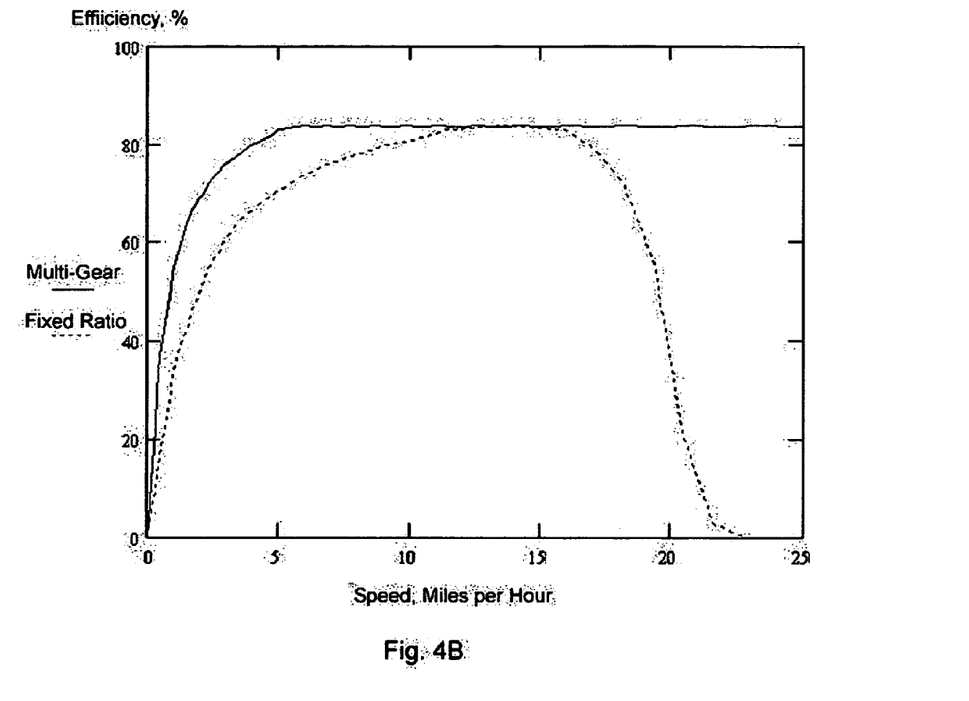
FIG. 4B shows a graph of electric bicycle motor efficiency vs speed for geared and single speed operation.
Figure 5:
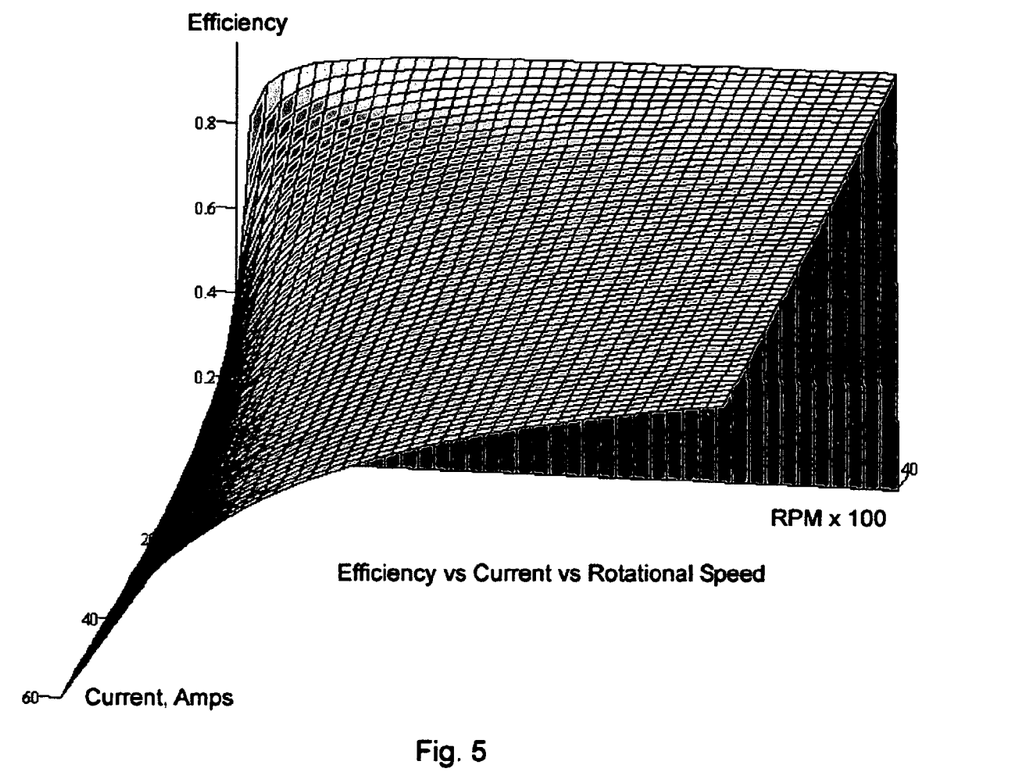
FIG. 5 shows the relationship between rotational speed, current, and efficiency for permanent magnet DC motors, both brush and brushless types.

FIGS. 3–5

FIG. 3 shows speed versus torque, current, power, and efficiency for a popular permanent magnet DC (PMDC) bicycle assist motor. Superimposed on the plots are vertical lines showing how gearing would constrain the rotational speed of the motor assuming the rider stays within a very wide cadence (pedal rotational speed) range of 50 to 120 RPM. Note how efficiency stays near its maximum throughout this range.

FIG. 4A shows a plot of maximum rear wheel thrust versus speed for the PMDC motor of FIG. 3 driving through both a single speed and a multi-speed bicycle drive train. Gearing, in the multi-speed case, was chosen to match currently available rear wheel gearing options for bicycles.

Rear wheel thrust is the force on the pavement available to overcome rolling resistance, wind drag and, during hill climbs, gravity.

FIG. 4A clearly shows the advantages of geared operation. At all speeds but one, the geared drive train is capable of putting out more rear-wheel thrust. Also, since the graph assumes identical motors, it should be clear that any motor would produce performance in the geared case that is superior to the same motor operating through a single fixed ratio.

FIG. 4B plots motor efficiency versus speed for the PMDC motor of FIG. 3 driving through both single and multi speed bicycle drive trains. The motor specifications are the same as the motor of FIG. 4A. Note that in the single speed case, the motor operates at peak efficiency over only a narrow speed range. Hill climbing is likely to slow the bike and leave the motor operating in a less efficient speed range. Similarly, if the rider is going fast on level terrain and pedal assisting, she may easily cause the motor to fall off of the upper end of the peak efficiency range. Contrast these statements with the efficiency curve for multi-speed operation. In this case the motor is almost always operating at peak efficiency.

The motor of FIGS. 3, 5A, and 5B is a commercially available model actually used in production electric bicycles. As such, it is actually optimized for single speed operation, meaning it has as broad a peak of high efficiency operation as is practicable given the need for good low speed torque for startup and hill climbing.

FIG. 5 shows a 3D plot of winding current versus rotational speed versus efficiency for a generic permanent magnet DC motor. The plot shows that low speed efficiency is highest when current is limited. Similarly, high current and high efficiencies only occur at high rotational speeds.

For permanent magnet DC motors, torque is directly proportional to winding current. Thus a motor that is optimized for efficient operation over the broadest speed range will have current and hence torque that starts low and ramps up with increasing rotational speed. Such a motor would have insufficient low speed torque for use in a single speed bicycle drive train. A multi-speed drive train could, however, make good use of such a motor. At low speeds, the torque multiplication supplied by the gears would make up for the lack of motor torque. With such a motor, the graph of FIG. 4B would show even greater advantage over a single speed motor and drive train combination.

ALTERNATIVE EMBODIMENTS

The essential features of the present invention are:

(a) a motor assist unit able to be mounted between pedals and driven wheel of a pedal powered chain or belt driven vehicle having a sufficiently long chain run to make such a mounting practicable;

(b) the ability to independently power the vehicle with the motor alone, pedals alone, or with the power from both pedals and motor blended;

(c) having a throttle and/or control system to vary the motor power under control of the rider.

A number of alternative embodiments are possible that have these features. For example, the freewheel of freewheel sprocket 36 could be moved into the shaft connecting the pedals to the pedal powered vehicles front sprocket. Or, the freewheel of freewheel sprocket 24 could be replaced by an electrically actuated clutch that only engaged the motor to the sprocket when power was requested.

A pedal powered vehicle fitted with our power assist unit need not necessarily be a bicycle or tricycle. The number of wheels is of no consequence.

Similarly, there is nothing that requires a pedal powered vehicle fitted with our power assist unit to have a multi-speed gear changing mechanism. Not having such a mechanism will reduce performance but will still reap the other benefits of the power assist unit.

Advantages

From the description above a number of advantages of our recumbent bicycle with power assist unit become evident:

(a) it allows a multi-speed electric assist to be fitted to commercially available recumbent bicycles and tricycles that uses the same speed changing means employed by the rider;

(b) the multi-speed operation gives a converted recumbent bicycle speed and hill climbing abilities beyond what is possible with a single speed drive of equivalent motor power;

(c) multi-speed operation allows for high motor efficiency to be maintained over a broader range of bicycle speeds as compared to single speed motor drives;

(d) shifting performance of long chain line recumbents is improved by splitting the chain into two segments thus shortening the length of chain that a derailleur must shift;

(e) the multi-speed electric assist's superior hill climbing ability mitigates a recumbent bicycle or tricycle's inherently weaker hill climbing as compared to a conventional bicycle;

(f) the multi-speed electric assist's superior top speed capabilities as compared to a single speed electric assist takes advantage of the inherently better aerodynamics of a recumbent bicycle as compared to a conventional bicycle;

(g) advantages (e) and (f) combine with the inherently superior comfort of the recumbent bicycle design as compared to a conventional bicycle to make the multi-speed electrically assisted recumbent bicycle or tricycle a superior personal transportation device.

We claim:

1. A pedal operated recumbent bicycle or tricycle defined as:
   (a) a two or three wheel vehicle having a pedal mechanism for propulsion,
   (b) said pedal mechanism having a shaft rotatably mounted transverse to the vehicle structure and having a distance between the shaft rotational axis and a driven rear wheel axle centerline of 24 inches or greater and,
   (c) having means for transferring pedal power to a rear wheel or wheel pair and,
   (d) having a seat to support the rider in a position rearward of the pedal shaft and,
   (e) said seat having means in addition to simple friction between rider and seating surface to resist rearward motion of a rider exerting leg muscle force on the pedals and,
   (f) the lowest point of the seating surface of said seat being no more than 20 vertical inches above the rotational axis of said pedal shaft and,
   said pedal operated recumbent bicycle or tricycle having an electric assist unit mounted between an imaginary vertical line drawn through the pedal shaft and an imaginary vertical line drawn through the driven rear wheel axle and having a means for transmitting power to a rear wheel or wheels and a means for transmitting power received from the pedal mechanism to said rear wheel or wheels, said electric assist unit comprising:

(a) a means for mounting the electric assist unit to the frame of said recumbent bicycle or tricycle,
(b) a support means for holding the elements of the electric assist unit in the correct positions relative to one another,
(c) an electric motor having a means of controllably varying output torque, power, or speed,
(d) said electric motor being coupled via an overrunning clutch to a speed reducing means,
(e) said overrunning clutch being arranged to allow the speed reducing means to be rotated at a speed faster than the motor shaft without driving the motor,
(f) said speed reducing means driving one or two rear wheels via a power transmission means,
(g) said power transmission means allowing the ratio of motor rotational speed to wheel rotational speed to be changed while in operation,
(h) the pedals of the recumbent bicycle or tricycle being coupled to said speed reducing means through another overrunning clutch such that the pedals may drive the rear wheels via the speed reducing means but will not be driven by the speed reducing means and,
(i) a source of electric current selected from the group consisting of capacitors and inductors and storage batteries and fuel cells and photovoltaic cells and thermoelectric devices.

2. A recumbent bicycle or tricycle as set forth in claim 1 further including a second seat and pedal mechanism disposed forward or in tandem with the first seat.

3. A recumbent bicycle or tricycle as set forth in claim 1 wherein the electric assist unit is detachable.

4. An electric assist unit for recumbent bicycles and tricycles comprising:

(a) a means for mounting the electric assist unit onto a recumbent bicycle or a tricycle between pedals and rear axle,
(b) a support means for holding the elements of the electric assist unit in the correct positions relative to one another,
(c) an electric motor having a means of controllably varying output torque, power, or speed,
(d) said electric motor being coupled via an overrunning clutch to a speed reducing means,
(e) said overrunning clutch being arranged to allow the speed reducing means to be rotated at a speed faster than the motor without driving the motor,
(f) said speed reducing means driving one or more rear wheels via a power transmission means,
(g) said power transmission means allowing the ratio of motor rotational speed to wheel rotational speed to be changed while in operation,
(h) the pedals of the recumbent bicycle or tricycle coupled to said speed reducing means through another overrunning clutch such that the pedals may drive the rear wheels but will not be driven by the speed reducing means and,
(i) a source of electric current selected from the group consisting of capacitors and inductors and storage batteries and fuel cells and photovoltaic cells and thermoelectric devices.

5. An electric assist unit as set forth in claim 4 having a rear wheel drive chain and a means for guiding said rear wheel drive chain onto a sprocket on the electric assist unit so as to inhibit chain derailment.

6. An electric assist unit as set forth in claim 4 having a chain for transmitting power from pedals to the assist unit and having a means for applying tension to said chain so as to allow the bicycle to have a functioning front derailleur mechanism.

7. An electric assist unit as set forth in claim 4 having a means for sensing the force, energy, or power being transmitted from the pedals to the unit.

\* \* \* \* \*